United States Patent
Arora et al.

(10) Patent No.: US 11,184,355 B2
(45) Date of Patent: *Nov. 23, 2021

(54) PREVENTING UNAUTHORIZED ACCESS TO SECURED INFORMATION SYSTEMS USING AUTHENTICATION TOKENS AND MULTI-DEVICE AUTHENTICATION PROMPTS

(71) Applicant: Bank of America Corporation, Charlotte, NC (US)

(72) Inventors: Ashish Arora, Issaquah, WA (US); Muniraju Jayaramaiah, Bellevue, WA (US); Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,593

(22) Filed: Apr. 7, 2021

(65) Prior Publication Data

US 2021/0226943 A1 Jul. 22, 2021

Related U.S. Application Data

(63) Continuation of application No. 16/832,377, filed on Mar. 27, 2020, now Pat. No. 11,005,840, which is a
(Continued)

(51) Int. Cl.
*H04L 29/06* (2006.01)

(52) U.S. Cl.
CPC ...... *H04L 63/0853* (2013.01); *H04L 63/0861* (2013.01); *H04L 63/102* (2013.01); *H04L 2463/082* (2013.01)

(58) Field of Classification Search
CPC ............ H04L 63/0853; H04L 63/0861; H04L 63/0876; H04L 63/105; H04L 63/102; H04L 2463/082
(Continued)

(56) References Cited

U.S. PATENT DOCUMENTS 6,898,711 B1 * 5/2005 Bauman .................. G06F 21/31
713/182
8,627,438 B1 * 1/2014 Bhimanaik ............. G06F 21/36
726/9
(Continued)

OTHER PUBLICATIONS

Jun. 18, 2019 U.S. Non-Final Office Action—U.S. Appl. No. 15/593,483.
(Continued)

*Primary Examiner* — Noura Zoubair
*Assistant Examiner* — Mahabub S Ahmed
(74) *Attorney, Agent, or Firm* — Banner & Witcoff, Ltd.; Michael A. Springs

(57) ABSTRACT

Aspects of the disclosure relate to preventing unauthorized access to secured information systems. A computing platform may receive, from an end user desktop computing device, a request to login to a user account associated with a user account portal. In response to receiving the request, the computing platform may generate an authentication token in an authentication database and may send a notification to at least one registered device linked to the user account. After sending the notification, the computing platform may receive, from the at least one registered device, an authentication response message. If the authentication response message indicates that valid authentication input was received, the computing platform may update the authentication token to indicate that the request to login to the user account has been approved. After updating the
(Continued)

authentication token, the computing platform may provide, to the end user desktop computing device, access to a portal interface.

20 Claims, 12 Drawing Sheets

Related U.S. Application Data continuation of application No. 15/593,483, filed on May 12, 2017, now Pat. No. 10,645,079.

(58) Field of Classification Search
USPC .......................................... 726/4, 21, 79, 17
See application file for complete search history.

(56) References Cited

U.S. PATENT DOCUMENTS

| | | | | |
|---|---|---|---|---|
| 8,793,490 | B1* | 7/2014 | Szwalbenest | H04L 63/0853 713/168 |
| 9,130,929 | B2* | 9/2015 | Dorfman | H04L 63/0823 |
| 9,578,015 | B2* | 2/2017 | Xu | H04L 63/10 |
| 9,660,985 | B2* | 5/2017 | Cao | H04L 63/0853 |
| 9,992,194 | B2* | 6/2018 | Oberheide | H04L 9/32 |
| 10,122,709 | B2* | 11/2018 | Momchilov | G06F 21/41 |
| 2005/0120204 | A1* | 6/2005 | Kiwimagi | G06F 21/33 713/156 |
| 2007/0039039 | A1* | 2/2007 | Gilbert | H04L 63/0876 726/4 |
| 2008/0086767 | A1* | 4/2008 | Kulkarni | H04L 9/3215 726/9 |
| 2008/0098464 | A1* | 4/2008 | Mizrah | G06F 21/36 726/5 |
| 2009/0067686 | A1* | 3/2009 | Boshra | G07C 9/37 382/124 |
| 2012/0116973 | A1* | 5/2012 | Klein | G06Q 20/40 705/44 |
| 2013/0046990 | A1* | 2/2013 | Fahrny | H04L 9/3247 713/176 |
| 2013/0060708 | A1* | 3/2013 | Oskolkov | G06Q 20/10 705/75 |
| 2013/0124416 | A1* | 5/2013 | Pawar | G06Q 20/10 705/44 |
| 2013/0179350 | A1* | 7/2013 | Kirillin | G06Q 20/4014 705/64 |
| 2013/0297513 | A1* | 11/2013 | Kirillin | G06Q 20/4014 705/67 |
| 2013/0346922 | A1* | 12/2013 | Shiplacoff | H04L 65/403 715/835 |
| 2014/0007213 | A1* | 1/2014 | Sanin | H04L 63/0807 726/9 |
| 2014/0026193 | A1* | 1/2014 | Saxman | H04L 63/102 726/4 |
| 2014/0053242 | A1* | 2/2014 | Counterman | H04L 67/306 726/4 |
| 2014/0075515 | A1* | 3/2014 | McColgan | H04W 12/069 726/4 |
| 2014/0189841 | A1* | 7/2014 | Metke | G06F 21/40 726/9 |
| 2014/0208400 | A1* | 7/2014 | Henshaw | H04W 12/06 726/5 |
| 2014/0208404 | A1* | 7/2014 | Brouwer | H04L 63/062 726/6 |
| 2014/0220933 | A1* | 8/2014 | Lynes | H04W 12/069 455/410 |
| 2014/0245396 | A1* | 8/2014 | Oberheide | G06F 21/40 726/4 |
| 2014/0279514 | A1* | 9/2014 | Sharp | G06Q 20/326 705/44 |
| 2014/0289528 | A1* | 9/2014 | Baghdasaryan | G06F 21/32 713/171 |
| 2014/0373093 | A1* | 12/2014 | Wood | H04L 63/08 726/3 |
| 2015/0025874 | A1* | 1/2015 | Matute | H04W 12/068 704/4 |
| 2015/0261948 | A1* | 9/2015 | Marra | G06F 21/42 726/4 |
| 2015/0295921 | A1* | 10/2015 | Cao | G06F 21/44 726/7 |
| 2015/0365400 | A1* | 12/2015 | Cox | H04L 63/18 726/7 |
| 2016/0014131 | A1* | 1/2016 | Neafsey | H04W 12/082 713/171 |
| 2016/0078430 | A1* | 3/2016 | Douglas | G06Q 30/0185 705/43 |
| 2016/0086176 | A1* | 3/2016 | Silva Pinto | G06Q 20/321 705/44 |
| 2016/0087981 | A1* | 3/2016 | Dorresteijn | G06F 21/34 726/7 |
| 2016/0189147 | A1* | 6/2016 | Vanczak | G06Q 20/3829 705/71 |
| 2016/0197914 | A1* | 7/2016 | Oberheide | H04L 63/0869 713/183 |
| 2016/0285633 | A1* | 9/2016 | Allinson | G06F 21/34 |
| 2017/0019396 | A1* | 1/2017 | Bettenburg | H04L 63/0428 |
| 2017/0106290 | A1 | 4/2017 | Pierce et al. | |
| 2017/0108935 | A1 | 4/2017 | Ricci | |
| 2017/0111336 | A1 | 4/2017 | Davis et al. | |
| 2017/0115648 | A1 | 4/2017 | Nixon et al. | |
| 2017/0116585 | A1 | 4/2017 | Rosano | |
| 2017/0118025 | A1 | 4/2017 | Shastri et al. | |
| 2017/0118185 | A1 | 4/2017 | Chastain et al. | |
| 2017/0118190 | A1 | 4/2017 | Livesay et al. | |
| 2017/0118202 | A1 | 4/2017 | Mathew et al. | |
| 2017/0124296 | A1 | 5/2017 | Baldwin et al. | |
| 2017/0124297 | A1 | 5/2017 | Baldwin et al. | |
| 2017/0124298 | A1 | 5/2017 | Baldwin et al. | |
| 2017/0124299 | A1 | 5/2017 | Baldwin et al. | |
| 2017/0124300 | A1 | 5/2017 | Baldwin et al. | |
| 2017/0124301 | A1 | 5/2017 | Baldwin et al. | |
| 2017/0124302 | A1 | 5/2017 | Baldwin et al. | |
| 2017/0124303 | A1 | 5/2017 | Baldwin et al. | |
| 2017/0124540 | A1 | 5/2017 | Chan et al. | |
| 2017/0124564 | A1 | 5/2017 | Pi Farias | |
| 2017/0124670 | A1 | 5/2017 | Becker et al. | |
| 2017/0124812 | A1 | 5/2017 | Washington et al. | |
| 2017/0126660 | A1* | 5/2017 | Brannon | H04L 63/12 |
| 2017/0126692 | A1 | 5/2017 | Stuntebeck | |
| 2017/0127214 | A1 | 5/2017 | Sohn et al. | |
| 2017/0128769 | A1 | 5/2017 | Long et al. | |
| 2017/0129603 | A1 | 5/2017 | Raptopoulos et al. | |
| 2017/0132402 | A1 | 5/2017 | Thibadeau, Sr. et al. | |
| 2017/0132656 | A1 | 5/2017 | Marcus | |
| 2017/0134402 | A1 | 5/2017 | Boivie | |
| 2017/0134906 | A1 | 5/2017 | Yoo | |
| 2017/0134946 | A1 | 5/2017 | Kang et al. | |
| 2017/0163637 | A1* | 6/2017 | Peterson | H04L 63/04 |
| 2017/0262841 | A1* | 9/2017 | Good | G06Q 20/12 |
| 2017/0286656 | A1* | 10/2017 | Kohli | G06F 21/35 |
| 2017/0344732 | A1* | 11/2017 | Kohli | G06Q 20/2295 |
| 2017/0346815 | A1* | 11/2017 | Andrews | H04L 63/0876 |
| 2017/0374551 | A1* | 12/2017 | Shen | H04L 29/06 |
| 2018/0181958 | A1* | 6/2018 | Locke | G07F 7/0826 |
| 2018/0276618 | A1* | 9/2018 | Nichani | G06Q 10/1053 |
| 2019/0052628 | A1* | 2/2019 | Beiter | G06F 21/42 |
| 2019/0207938 | A1* | 7/2019 | Maezawa | H04L 63/0876 |

OTHER PUBLICATIONS

Oct. 8, 2019 U.S. Final Office Action—U.S. Appl. No. 15/593,483.
Jan. 8, 2021 U.S. Notice of Allowance and Fees Due—U.S. Appl. No. 16/832,337.
Sep. 3, 2020 U.S. Non-Final Office Action—U.S. Appl. No. 16/832,377.

\* cited by examiner

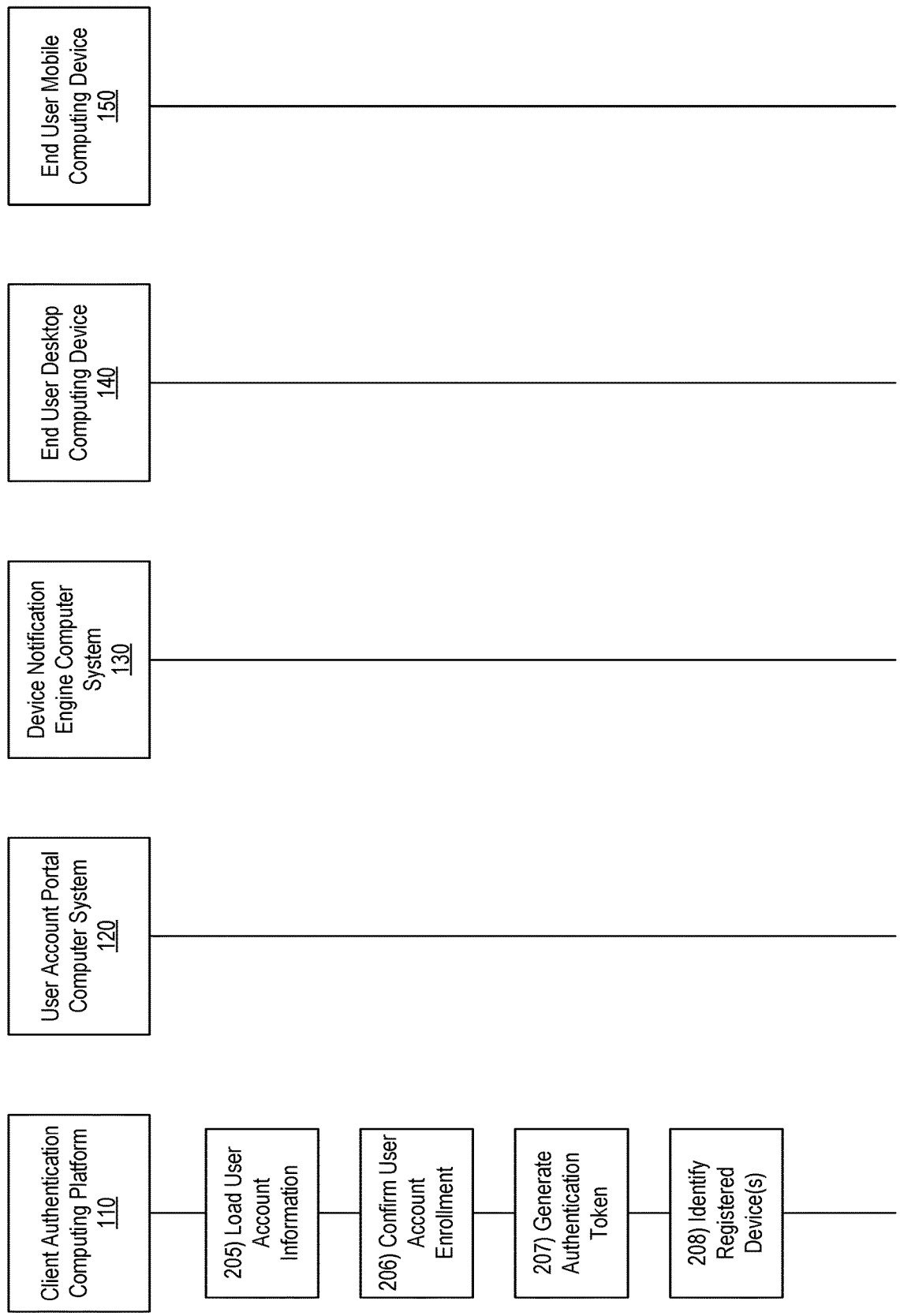

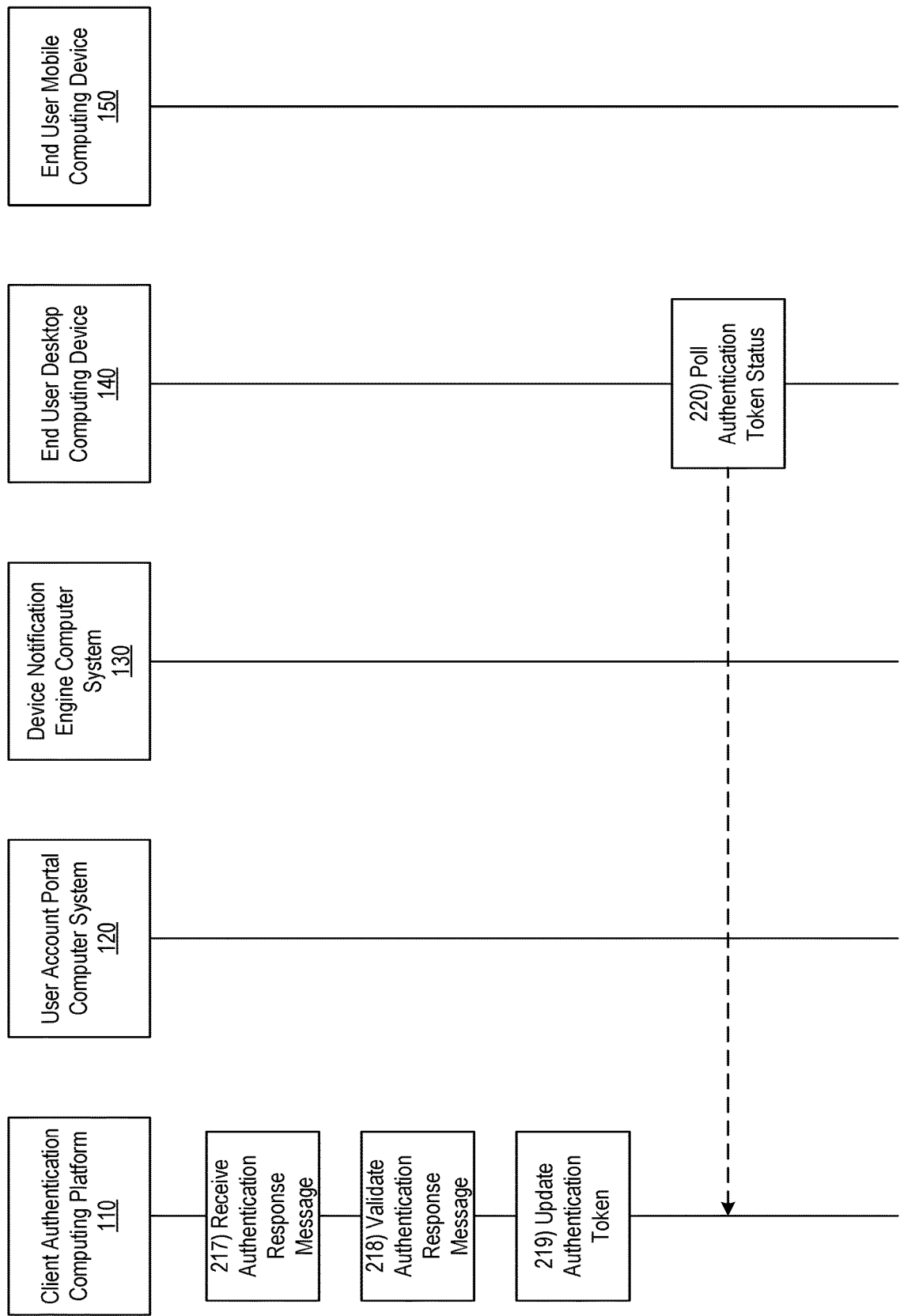

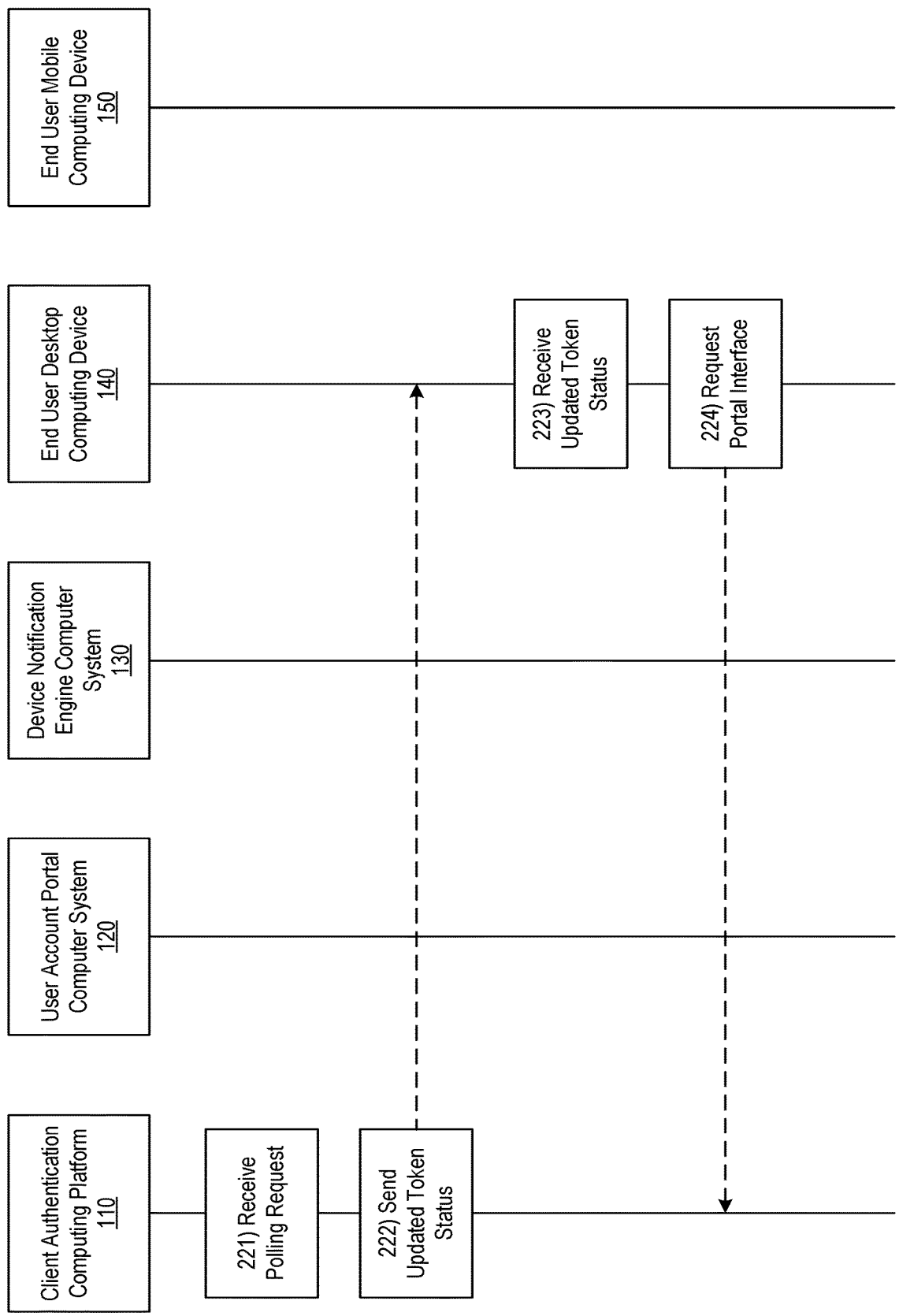

PREVENTING UNAUTHORIZED ACCESS TO SECURED INFORMATION SYSTEMS USING AUTHENTICATION TOKENS AND MULTI-DEVICE AUTHENTICATION PROMPTS

CROSS-REFERENCE TO RELATED APPLICATIONS

This application claims the benefit of and is a continuation of U.S. patent application Ser. No. 16/832,377, filed Mar. 27, 2020, and entitled "Preventing Unauthorized Access To Secured Information Systems Using Authentication Tokens And Multi-Device Authentication Prompts," which claims the benefit of and is a continuation of U.S. patent application Ser. No. 15/593,483, filed May 12, 2017, and entitled "Preventing Unauthorized Access To Secured Information Systems Using Authentication Tokens And Multi-Device Authentication Prompts." Each of the foregoing applications is incorporated by reference herein in its entirety.

BACKGROUND

Aspects of the disclosure relate to electrical computers and digital processing systems, information security, and protecting data processing systems, information, and services. In particular, one or more aspects of the disclosure relate to preventing unauthorized access to secured information systems using authentication tokens and multi-device authentication prompts.

An organization may deploy computing infrastructure to provide one or more user account portals that allow remote users to access secure information maintained by the organization. As greater amounts of information and different types of information is made available via such portals, it may become increasingly important to ensure the safety and security of the information that is available via such portals, and correspondingly, how access to such portals is granted and/or controlled for different user devices. In many instances, however, it may be difficult to provide ever greater levels of information security while also optimizing the technical performance and efficient operations of the computing infrastructure that host and/or otherwise provide user account portals, particularly as such portals are provided to greater amounts of users and enable access to greater amounts of secure information.

SUMMARY

Aspects of the disclosure provide effective, efficient, scalable, and convenient technical solutions that address and overcome the technical problems associated with deploying computing infrastructure and providing user account portals. In particular, one or more aspects of the disclosure provide techniques for preventing unauthorized access to secured information systems using authentication tokens and multi-device authentication prompts.

In accordance with one or more embodiments, a computing platform having at least one processor, a memory, and a communication interface may receive, via the communication interface, from an end user desktop computing device, a request to login to a user account associated with a user account portal. In response to receiving the request to login to the user account associated with the user account portal, the computing platform may generate an authentication token in an authentication database. In addition, the computing platform may send a notification to at least one registered device linked to the user account associated with the user account portal. After sending the notification to the at least one registered device linked to the user account associated with the user account portal, the computing platform may receive, via the communication interface, from the at least one registered device linked to the user account associated with the user account portal, an authentication response message. If the authentication response message indicates that valid authentication input was received by the at least one registered device linked to the user account associated with the user account portal, the computing platform may update the authentication token in the authentication database to indicate that the request to login to the user account associated with the user account portal has been approved. After updating the authentication token in the authentication database to indicate that the request to login to the user account associated with the user account portal has been approved, the computing platform may provide, to the end user desktop computing device, access to a portal interface based on the authentication token in the authentication database.

In some embodiments, if the authentication response message does not indicate that valid authentication input was received by the at least one registered device linked to the user account associated with the user account portal, the computing platform may generate an error message for the end user desktop computing device. Subsequently, the computing platform may send, via the communication interface, to the end user desktop computing device, the error message generated for the end user desktop computing device.

In some embodiments, the request to login to the user account associated with the user account portal may include a username corresponding to the user account associated with the user account portal.

In some embodiments, prior to generating the authentication token in the authentication database, the computing platform may load, from a user account database, user account information corresponding to the user account associated with the user account portal. Subsequently, the computing platform may confirm, based on the user account information loaded from the user account database, that the user account associated with the user account portal is enrolled for multi-device authentication prompts.

In some embodiments, prior to sending the notification to the at least one registered device linked to the user account associated with the user account portal, the computing platform may identify the at least one registered device as being linked to the user account associated with the user account portal based on user account information loaded from a user account database.

In some embodiments, sending the notification to the at least one registered device linked to the user account associated with the user account portal may include: generating one or more commands directing a notification engine system to push at least one authentication notification to the at least one registered device linked to the user account associated with the user account portal; and sending, via the communication interface, to the notification engine system, the one or more commands directing the notification engine system to push the at least one authentication notification to the at least one registered device linked to the user account associated with the user account portal.

In some embodiments, the one or more commands directing the notification engine system to push the at least one authentication notification to the at least one registered device linked to the user account associated with the user account portal may be configured to cause the at least one registered device linked to the user account associated with the user account portal to present at least one authentication prompt. In some instances, receiving the authentication response message may include receiving information indicating that valid authentication input was received by the at least one registered device linked to the user account associated with the user account portal in response to the at least one authentication prompt.

In some embodiments, the one or more commands directing the notification engine system to push the at least one authentication notification to the at least one registered device linked to the user account associated with the user account portal may be configured to cause the at least one registered device linked to the user account associated with the user account portal to present at least one biometric authentication prompt. In some instances, receiving the authentication response message may include receiving information indicating that valid authentication input was received by the at least one registered device linked to the user account associated with the user account portal in response to the at least one biometric authentication prompt.

In some embodiments, providing the access to the portal interface based on the authentication token in the authentication database may include providing the access to the portal interface after receiving a polling request from the end user desktop computing device.

In some embodiments, providing the access to the portal interface based on the authentication token in the authentication database may include redirecting the end user desktop computing device to a user account portal computer system. In some instances, redirecting the end user desktop computing device to a user account portal computer system may include launching an authenticated user account portal session on the user account portal computer system for a web application on the end user desktop computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for preventing unauthorized access to secured information systems using authentication tokens and multi-device authentication prompts in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, one or more aspects of the disclosure provide techniques for preventing unauthorized access to secured information systems using authentication tokens and multi-device authentication prompts. In particular, some aspects of the disclosure relate to improved techniques for authenticating a user of a user device to a user account of a user account portal. For example, when one or more aspects of the disclosure are implemented in connection with an online banking user account portal, a user may access the online banking user account portal on their desktop computing device, enter only their online banking user name, and then be authenticated to an online banking session on their desktop computing device by providing biometric input and/or other authentication input on their mobile computing device (e.g., without responding to further authentication prompts on their desktop computing device).

Figure 1A:
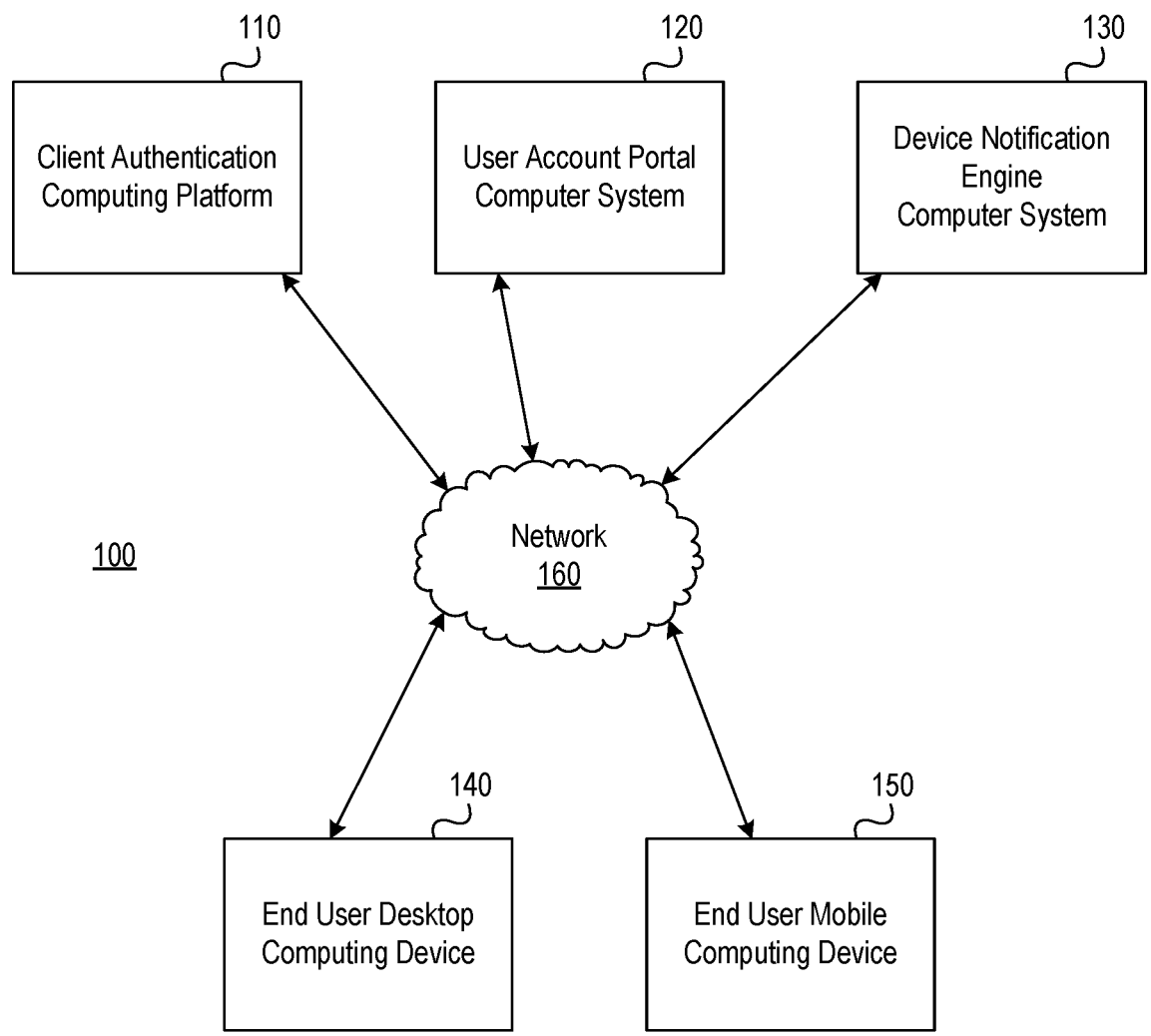
FIGS. 1A and 1B depict an illustrative computing environment for preventing unauthorized access to secured information systems using authentication tokens and multi-device authentication prompts in accordance with one or more example embodiments.
Figure 1B:
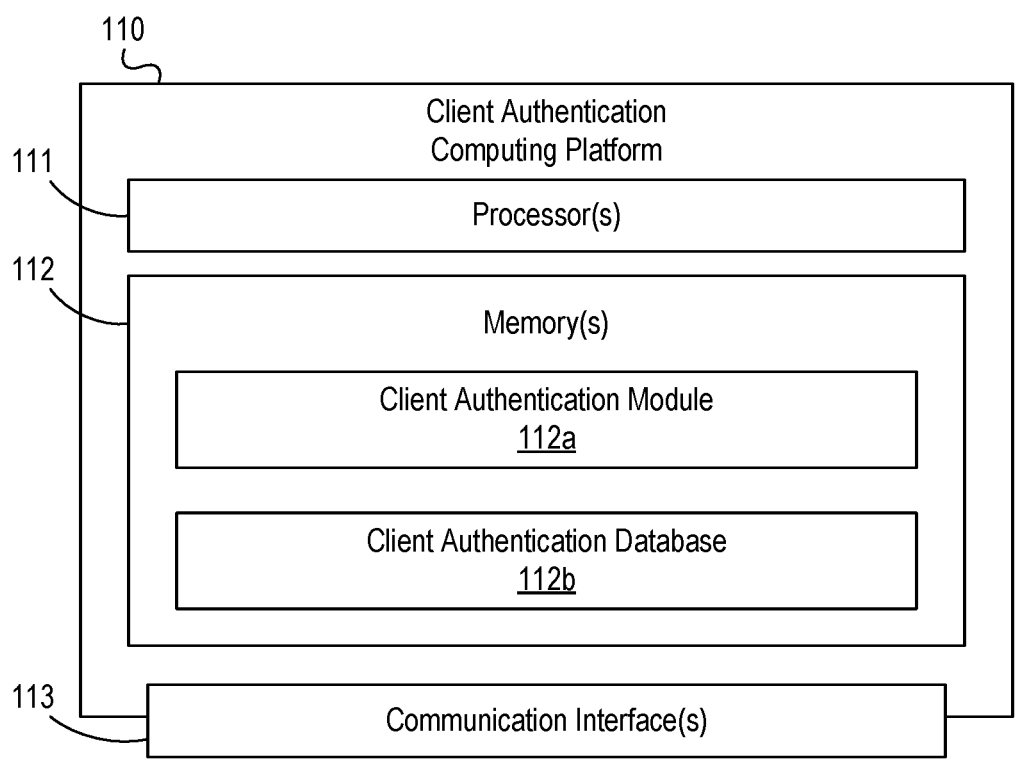

FIGS. 1A and 1B depict an illustrative computing environment for preventing unauthorized access to secured information systems using authentication tokens and multi-device authentication prompts in accordance with one or more example embodiments. Referring to FIG. 1A, computing environment 100 may include one or more computing platforms, one or more computing devices, and various other computing infrastructure. For example, computing environment 100 may include client authentication computing platform 110, user account portal computer system 120, device notification engine computer system 130, end user desktop computing device 140, and end user mobile computing device 150.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like) configured to perform one or more of the functions described herein, as discussed in greater detail below.

User account portal computer system 120 may include one or more computing devices configured to provide one or more user account portal interfaces to one or more end user devices. For example, user account portal computer system 120 may be configured to provide a customer portal, such as an online banking portal, to one or more customers of an organization, such as a financial institution, who may use one or more computing devices to access the portal and/or who may be authenticated to one or more portal user accounts by client authentication computing platform 110 using one or more authentication techniques discussed in greater detail below. In some instances, in addition to being configured to provide an online banking portal associated with a financial institution to one or more customers of the financial institution and/or their associated computing devices, user account portal computer system 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Device notification engine computer system 130 may include one or more computing devices configured to generate and/or send one or more push notifications to one or more user devices. For example, device notification engine computer system 130 may be configured to generate and send push notifications to various mobile computing devices (which may, e.g., execute various operating systems). In some instances, device notification engine computer system 130 may communicate directly with such mobile computing devices to send such notifications, while in other instances, device notification engine computer system 130 may communicate with one or more push notification services and/or other intermediary servers to send various notifications to various other computing devices.

End user desktop computing device 140 may be a desktop computing device that is used by and/or configured to be used by a first user (who may, e.g., be a customer of an organization operating client authentication computing platform 110, such as a customer of a financial institution operating client authentication computing platform 110). In addition, end user mobile computing device 150 may be a mobile computing device (e.g., a smart phone, a tablet computer, a wearable device, or another type of mobile device) that is used by and/or configured to be used by the first user (who may, e.g., be the same user as the user of end user desktop computing device 140).

Computing environment 100 also may include one or more networks, which may interconnect one or more of client authentication computing platform 110, user account portal computer system 120, device notification engine computer system 130, end user desktop computing device 140, and end user mobile computing device 150. For example, computing environment 100 may include network 160, which may include one or more public networks, one or more private networks, and/or one or more sub-networks (e.g., local area networks (LANs), wide area networks (WANs), or the like).

In one or more arrangements, user account portal computer system 120, device notification engine computer system 130, end user desktop computing device 140, end user mobile computing device 150, and other computer systems and computing devices included in computing environment 100 may be any type of computing device capable of receiving a user interface, receiving input via the user interface, and communicating the received input to one or more other computing devices. For example, user account portal computer system 120, device notification engine computer system 130, end user desktop computing device 140, and end user mobile computing device 150 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, client authentication computing platform 110 may include one or more processors 111, one or more memories 112, and one or more communication interfaces 113. A data bus may interconnect the one or more processors 111, the one or more memories 112, and the one or more communication interfaces 113. Communication interface 113 may be a network interface configured to support communication between client authentication computing platform 110 and one or more networks (e.g., network 160 or the like). Memory 112 may include one or more program modules having instructions that when executed by processor 111 cause client authentication computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112a and a client authentication database 112b. Client authentication module 112a may include executable instructions that enable and/or cause client authentication computing platform 110 to authenticate one or more end user devices to one or more user accounts and/or perform one or more other functions. Client authentication database 112b may store and/or maintain information that may be used by client authentication computing platform 110 in authenticating one or more end user devices to one or more user accounts and/or in performing one or more other functions.

Figure 2A:
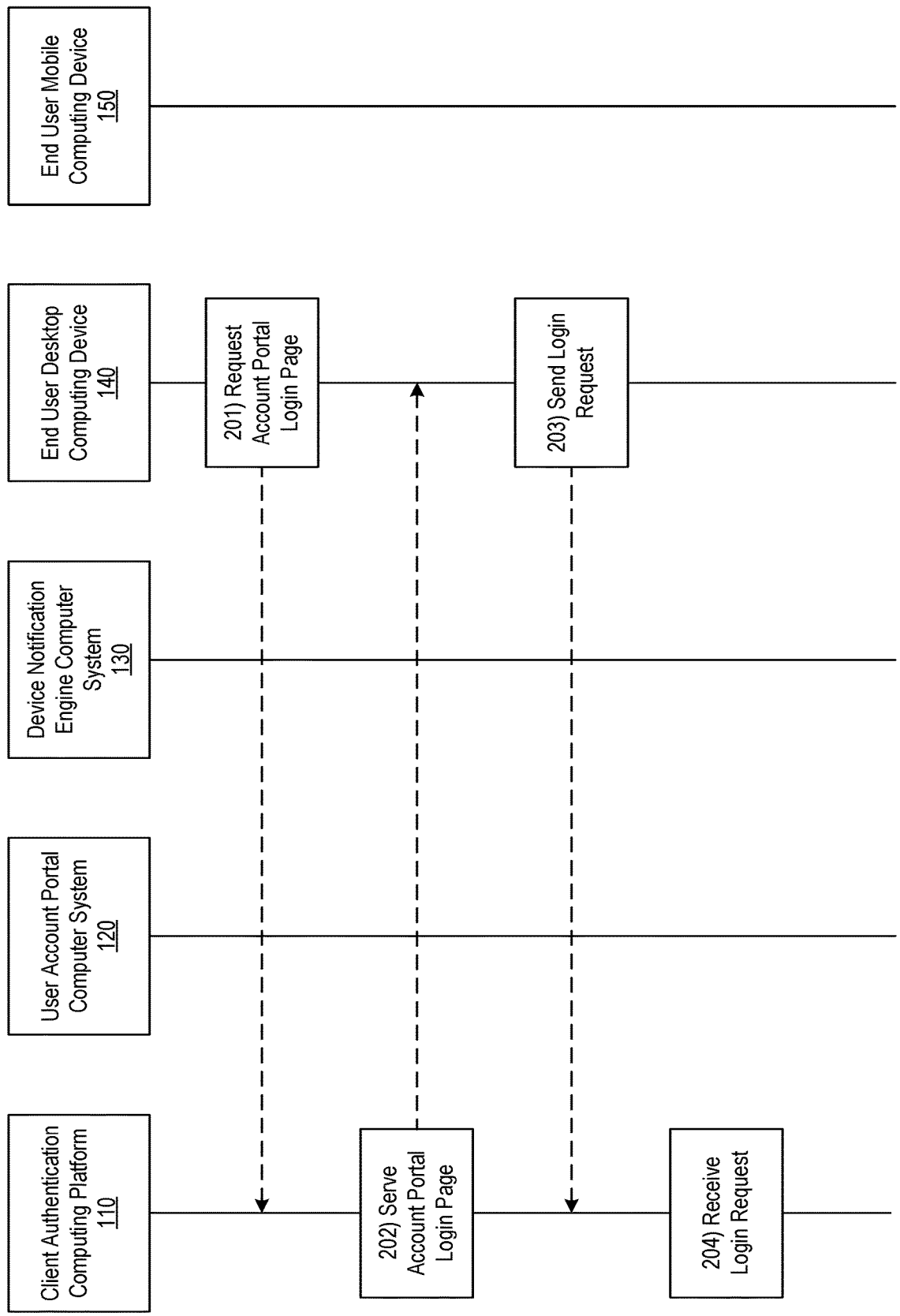

FIGS. 2A-2G depict an illustrative event sequence for preventing unauthorized access to secured information systems using authentication tokens and multi-device authentication prompts in accordance with one or more example embodiments. Referring to FIG. 2A, at step 201, end user desktop computing device 140 may request a login page for a user account portal. For example, end user desktop computing device 140 may execute a web browser application and may receive user input, via the web browser application, requesting a uniform resource locator associated with a login page for a user account portal associated with client authentication computing platform 110, such as an online banking portal provided by client authentication computing platform 110 and/or user account portal computer system 120. Subsequently, end user desktop computing device 140 may generate and send a request to client authentication computing platform 110 for the login page of the user account portal, and client authentication computing platform 110 may receive the request for the login page of the user account portal from end user desktop computing device 140.

Figure 3:
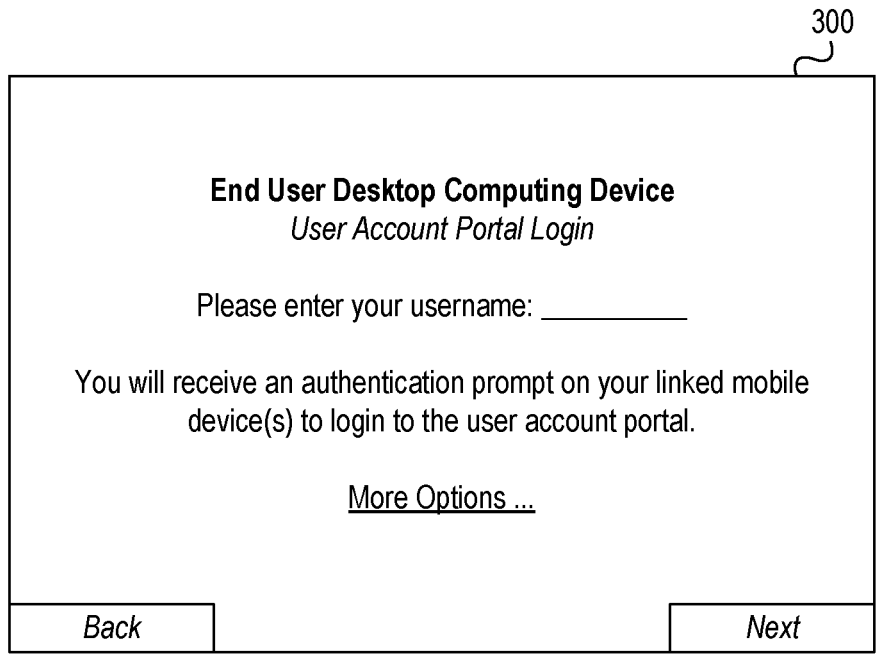
FIGS. 3-6 depict example graphical user interfaces for preventing unauthorized access to secured information systems using authentication tokens and multi-device authentication prompts in accordance with one or more example embodiments.

At step 202, client authentication computing platform 110 may serve the login page of the user account portal to end user desktop computing device 140. For example, at step 202, client authentication computing platform 110 may generate and send one or more web pages and/or other graphical user interfaces to end user desktop computing device 140 that may make up and/or otherwise be associated with the login page of the user account portal, which may enable the user of end user desktop computing device 140 to provide authentication input and/or otherwise request to login to a user account portal provided by and/or otherwise associated with client authentication computing platform 110 and/or user account portal computer system 120. In some instances, in serving the login page of the user account portal to end user desktop computing device 140, client authentication computing platform 110 may cause end user desktop computing device 140 to display and/or otherwise present one or more graphical user interfaces similar to graphical user interface 300, which is illustrated in FIG. 3. As seen in FIG. 3, graphical user interface 300 may include text and/or other user interface elements prompting the user of end user desktop computing device 140 to enter their username associated with the user account portal, explaining the authentication process to the user of end user desktop computing device 140 (e.g., "You will receive an authentication prompt on your linked mobile device(s) to login to the user account portal"), and/or allowing the user of end user desktop computing device 140 to access other options, including other options for logging into, authenticating with, and/or otherwise accessing the user account portal.

At step 203, end user desktop computing device 140 may send a login request to client authentication computing platform 110. For example, end user desktop computing device 140 may receive user input via graphical user interface 300 that includes a username corresponding to the user of end user desktop computing device 140 and requesting to login to the user account portal, and end user desktop computing device 140 accordingly may generate and send a login request to client authentication computing platform 110 that includes the username corresponding to the user of end user desktop computing device 140, other user input received from the user of end user desktop computing device 140, and/or other information associated with end user desktop computing device 140.

At step 204, client authentication computing platform 110 may receive the login request from end user desktop computing device 140, and the login request may, for instance, identify a specific user account to which end user desktop computing device 140 is requesting access. For example, at step 204, client authentication computing platform 110 may receive, via a communication interface (e.g., communication interface 113), from an end user desktop computing device (e.g., end user desktop computing device 140), a request to login to a user account associated with a user account portal.

In some embodiments, the request to login to the user account associated with the user account portal may include a username corresponding to the user account associated with the user account portal. For example, the request to login to the user account associated with the user account portal (which may, e.g., be received by client authentication computing platform 110 from end user desktop computing device 140 at step 204) may include a username corresponding to the user account associated with the user account portal, such as a username corresponding to the user of end user desktop computing device 140. In some instances, the request to login to the user account associated with the user account portal (which may, e.g., be received by client authentication computing platform 110 from end user desktop computing device 140 at step 204) may include only a username corresponding to the user account associated with the user account portal and might not include a password, one or more security answers, or any other authenticators associated with the user of end user desktop computing device 140. Rather, the user of end user desktop computing device 140 might provide only their username to client authentication computing platform 110, and client authentication computing platform 110 may subsequently authenticate the user of end user desktop computing device 140 to their user account and the user account portal by sending one or more authentication prompts to end user mobile computing device 150 (which may, e.g., be linked to the user of end user desktop computing device 140), as illustrated in greater detail below. In some instances, this approach may provide more convenience to the user of end user desktop computing device 140 when logging into their user account, while also increasing the information security provided by client authentication computing platform 110 and improving the processing speed and lowering the network bandwidth and computing resource consumption of user account portal computer system 120.

Referring to FIG. 2B, at step 205, client authentication computing platform 110 may load user account information for the user account identified in the login request, such as one or more user profiles associated with the requested user account. For example, at step 205, client authentication computing platform 110 may load, from a user account database (e.g., client authentication database 112b), user account information corresponding to the user account associated with the user account portal.

At step 206, client authentication computing platform 110 may confirm that the requested user account is enrolled in an appropriate authentication program, such as in an authentication program in which end user desktop computing device 140 may be authenticated and provided access to the requested user account by way of sending one or more authentication prompts to end user mobile computing device 150. If the requested user account is not enrolled in such an authentication program, client authentication computing platform 110 may generate and/or send one or more error messages (e.g., to end user desktop computing device 140) and the example event sequence may end. Otherwise, if the requested user account is enrolled in such an authentication program, the event sequence may proceed as illustrated.

For example, at step 206, client authentication computing platform 110 may confirm, based on the user account information loaded from the user account database (e.g., client authentication database 112b), that the user account associated with the user account portal is enrolled for multi-device authentication prompts. In some instances, the user account information may include information indicating that the user account associated with the user account portal is enrolled for multi-device authentication prompts based on the user of end user desktop computing device 140 and/or end user mobile computing device 150 consenting to multi-device authentication techniques (e.g., during creation of the user account) and/or based on the user registering one or more devices (e.g., end user desktop computing device 140, end user mobile computing device 150) to receive authentication notifications and/or access the user account.

At step 207, client authentication computing platform 110 may generate an authentication token in an authentication database (e.g., client authentication database 112b). For example, at step 207, in response to receiving the request to login to the user account associated with the user account portal, client authentication computing platform 110 may generate an authentication token in an authentication database (e.g., client authentication database 112b). The authentication token may, for instance, include a data structure that may uniquely identify the login request (e.g., the login request received by client authentication computing platform 110 from end user desktop computing device 140 at step 204), the device initiating the login request (e.g., end user desktop computing device 140), the user account to which access is being requested, a status indicator for the login request (e.g., pending, approved, denied, timed out, and/or the like), and/or other information associated with the login request.

At step 208, client authentication computing platform 110 may identify one or more registered devices linked to the user account to which access is being requested. For example, at step 208, client authentication computing platform 110 may identify at least one registered device (e.g., end user mobile computing device 150) as being linked to the user account associated with the user account portal based on user account information loaded from a user account database (e.g., client authentication database 112*b*).

Figure 2C:
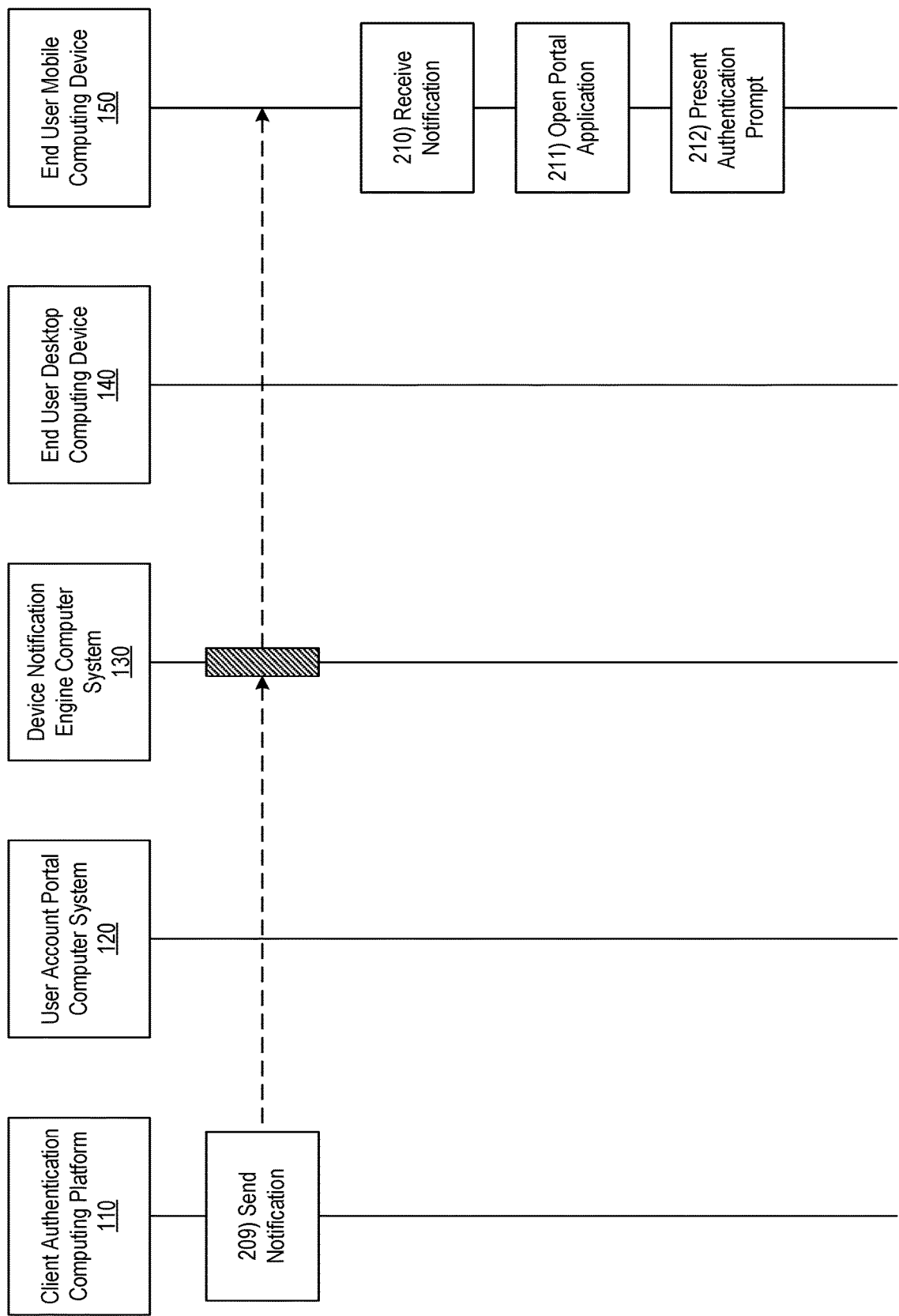

Referring to FIG. 2C, at step 209, client authentication computing platform 110 may send a notification to end user mobile computing device 150, and in some instances, the notification may be sent via device notification engine computer system 130. For example, at step 209, client authentication computing platform 110 may send a notification to at least one registered device (e.g., end user mobile computing device 150) linked to the user account associated with the user account portal. As illustrated in greater detail below, the notification (which may, e.g., be sent by client authentication computing platform 110 to end user mobile computing device 150) may cause end user mobile computing device 150 to present an authentication prompt on end user mobile computing device 150 that, if approved and/or otherwise validated, then may enable client authentication computing platform 110 to provide end user desktop computing device 140 with access to the requested user account via the user account portal.

In some embodiments, sending the notification to the at least one registered device linked to the user account associated with the user account portal may include: generating one or more commands directing a notification engine system to push at least one authentication notification to the at least one registered device linked to the user account associated with the user account portal; and sending, via the communication interface, to the notification engine system, the one or more commands directing the notification engine system to push the at least one authentication notification to the at least one registered device linked to the user account associated with the user account portal. For example, in sending the notification to the at least one registered device (e.g., end user mobile computing device 150) linked to the user account associated with the user account portal at step 209, client authentication computing platform 110 may generate one or more commands directing a notification engine system (e.g., device notification engine computer system 130) to push at least one authentication notification to the at least one registered device (e.g., end user mobile computing device 150) linked to the user account associated with the user account portal. In addition, client authentication computing platform 110 may send, via the communication interface (e.g., communication interface 113), to the notification engine system (e.g., device notification engine computer system 130), the one or more commands directing the notification engine system (e.g., device notification engine computer system 130) to push the at least one authentication notification to the at least one registered device (e.g., end user mobile computing device 150) linked to the user account associated with the user account portal.

In some instances, the one or more commands directing the notification engine system to push the at least one authentication notification to the at least one registered device linked to the user account associated with the user account portal may be configured to cause the at least one registered device linked to the user account associated with the user account portal to present at least one authentication prompt. For example, the one or more commands (which may, e.g., be generated and sent by client authentication computing platform 110) directing the notification engine system (e.g., device notification engine computer system 130) to push the at least one authentication notification to the at least one registered device (e.g., end user mobile computing device 150) linked to the user account associated with the user account portal may be configured to cause the at least one registered device (e.g., end user mobile computing device 150) linked to the user account associated with the user account portal to present at least one authentication prompt, such as an authentication prompt prompting the user to provide password input, security challenge answer input, biometric input, and/or other authentication input for validation by end user mobile computing device 150 and/or client authentication computing platform 110 in order to authenticate to the user account.

In some instances, the one or more commands directing the notification engine system to push the at least one authentication notification to the at least one registered device linked to the user account associated with the user account portal may be configured to cause the at least one registered device linked to the user account associated with the user account portal to present at least one biometric authentication prompt. For example, the one or more commands (which may, e.g., be generated and sent by client authentication computing platform 110) directing the notification engine system (e.g., device notification engine computer system 130) to push the at least one authentication notification to the at least one registered device (e.g., end user mobile computing device 150) linked to the user account associated with the user account portal may be configured to cause the at least one registered device (e.g., end user mobile computing device 150) linked to the user account associated with the user account portal to present at least one biometric authentication prompt, such as an authentication prompt prompting the user to provide fingerprint input, facial scan input, retinal scan input, voiceprint input, and/or other biometric input for validation by end user mobile computing device 150 and/or client authentication computing platform 110 in order to authenticate to the user account.

At step 210, end user mobile computing device 150 may receive the notification from client authentication computing platform 110 and/or device notification engine computer system 130. At step 211, end user mobile computing device 150 may open a portal application associated with the user account portal provided by client authentication computing platform 110 and/or user account portal computer system 120. For example, at step 211, responsive to receiving the notification from client authentication computing platform 110 and/or device notification engine computer system 130, end user mobile computing device 150 may open a mobile banking application distributed by and/or otherwise associated with a financial institution that may operate and/or otherwise be associated with client authentication computing platform 110 and/or user account portal computer system 120.

Figure 4:
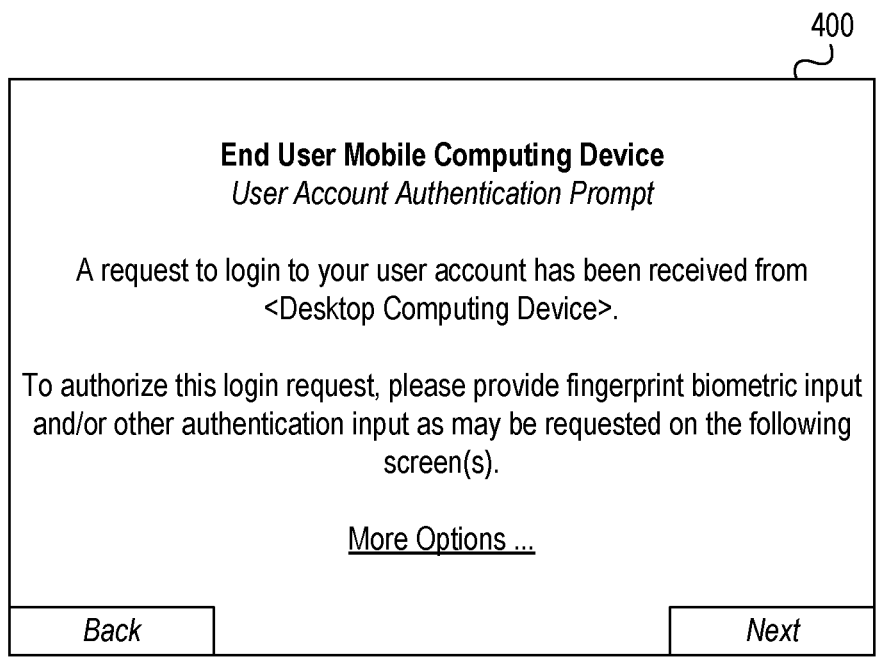

At step 212, end user mobile computing device 150 may present one or more authentication prompts based on the notification received from client authentication computing platform 110 and/or device notification engine computer system 130. For example, at step 212, end user mobile computing device 150 may present one or more authentication prompts based on the notification received from client authentication computing platform 110 and/or device notification engine computer system 130 by displaying and/or otherwise presenting one or more graphical user interfaces similar to graphical user interface 400, which is illustrated in FIG. 4. As seen in FIG. 4, graphical user interface 400 may include text and/or other user interface elements informing the user of end user mobile computing device 150 of the login request received by client authentication computing platform 110 (e.g., "A request to login to your user account has been received from <Desktop Computing Device>"), prompting the user of end user mobile computing device 150 to provide authentication input for validation by end user mobile computing device 150 and/or client authentication computing platform 110 (e.g., "To authorize this login request, please provide fingerprint biometric input and/or other authentication input as may be requested on the following screen(s)"), and/or providing the user of end user mobile computing device 150 with other options for responding to the notification.

Figure 2D:
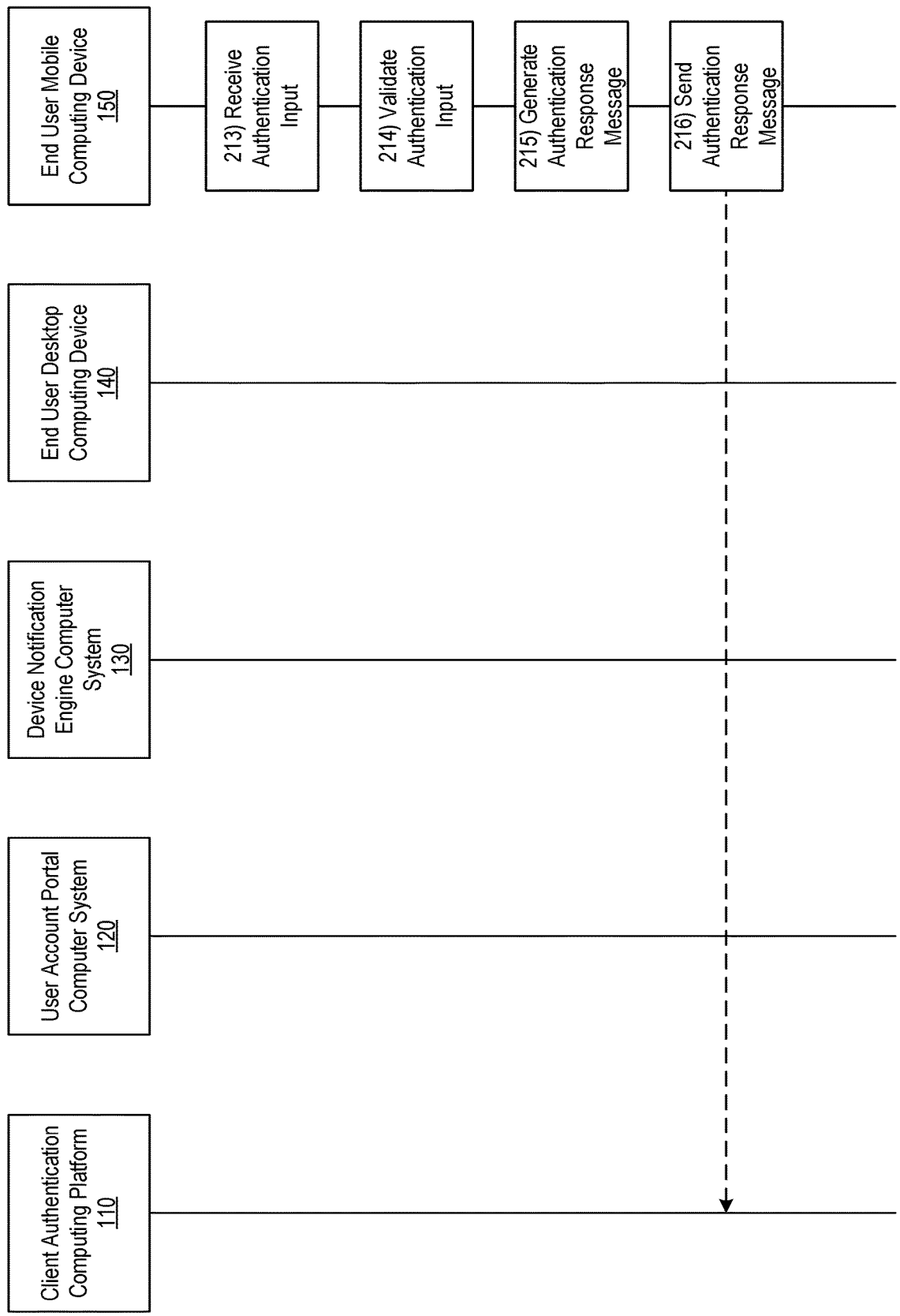
Figure 5:
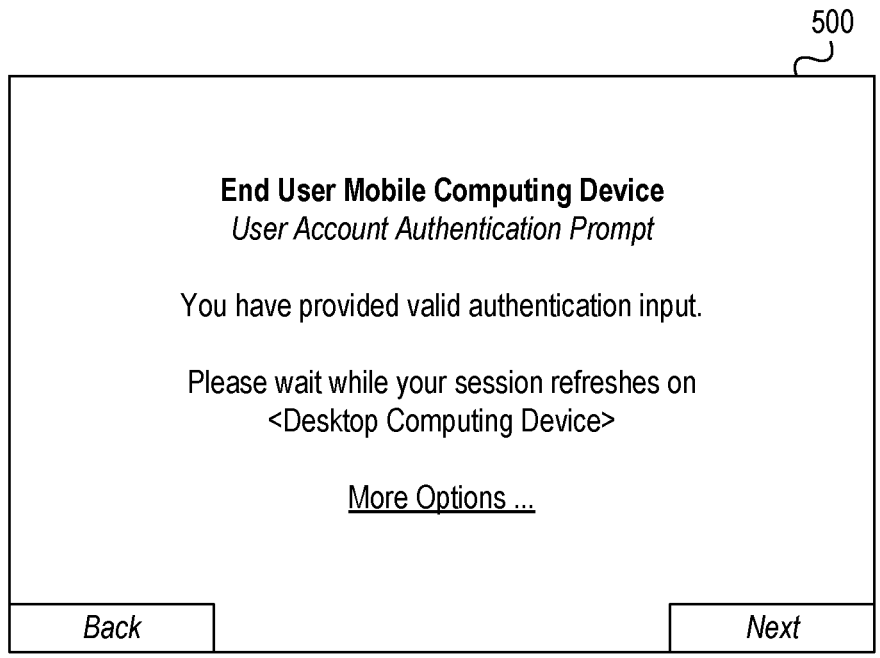

Referring to FIG. 2D, at step 213, end user mobile computing device 150 may receive authentication input (e.g., password input, security challenge answer input, biometric input, and/or other authentication input for validation by end user mobile computing device 150 and/or client authentication computing platform 110 in order to authenticate to the user account). At step 214, end user mobile computing device 150 may validate the authentication input. For example, at step 214, end user mobile computing device 150 may validate any and/or all of the authentication input locally at end user mobile computing device 150 and/or may send any and/or all of the authentication input to client authentication computing platform 110 for remote validation. If the authentication input is determined (e.g., by end user mobile computing device 150 and/or client authentication computing platform 110) to be invalid, then end user mobile computing device 150 may display and/or otherwise present an error message, and the example event sequence may end. Alternatively, if the authentication input is determined (e.g., by end user mobile computing device 150 and/or client authentication computing platform 110) to be valid, then end user mobile computing device 150 may display and/or otherwise present a success message, and the example event sequence may proceed as illustrated. In some instances, in presenting a success message (e.g., based on determining that the authentication input is valid), end user mobile computing device 150 may display and/or otherwise present one or more graphical user interfaces similar to graphical user interface 500, which is illustrated in FIG. 5. As seen in FIG. 5, graphical user interface 500 may include text and/or other user interface elements indicating that the authentication input was validated (e.g., "You have provided valid authentication input"), indicating that access to the user account portal will be provided on another device (e.g., "Please wait while your session refreshes on <Desktop Computing Device>"), and/or providing the user of end user mobile computing device 150 with other options.

At step 215, end user mobile computing device 150 may generate an authentication response message. For example, at step 215, end user mobile computing device 150 may generate an authentication response message based on validating the authentication input at step 214, and the authentication response message may include information indicating whether the authentication input was validated or alternatively determined to be invalid. At step 216, end user mobile computing device 150 may send the authentication response message to client authentication computing platform 110.

Referring to FIG. 2E, at step 217, client authentication computing platform 110 may receive the authentication response message. For example, at step 217, after sending the notification to the at least one registered device (e.g., end user mobile computing device 150) linked to the user account associated with the user account portal, client authentication computing platform 110 may receive, via the communication interface (e.g., communication interface 113), from the at least one registered device (e.g., end user mobile computing device 150) linked to the user account associated with the user account portal, an authentication response message.

In some instances, receiving the authentication response message may include receiving information indicating that valid authentication input was received by the at least one registered device linked to the user account associated with the user account portal in response to the at least one authentication prompt. For example, in receiving the authentication response message at step 217, client authentication computing platform 110 may receive information indicating that valid authentication input was received by the at least one registered device (e.g., end user mobile computing device 150) linked to the user account associated with the user account portal in response to the at least one authentication prompt (which may, e.g., have been presented by end user mobile computing device 150).

In some instances, receiving the authentication response message may include receiving information indicating that valid authentication input was received by the at least one registered device linked to the user account associated with the user account portal in response to the at least one biometric authentication prompt. For example, in receiving the authentication response message at step 217, client authentication computing platform 110 may receive information indicating that valid authentication input was received by the at least one registered device (e.g., end user mobile computing device 150) linked to the user account associated with the user account portal in response to the at least one biometric authentication prompt (which may, e.g., have been presented by end user mobile computing device 150).

At step 218, client authentication computing platform 110 may validate the authentication response message (e.g., by determining whether and/or confirm that the authentication response message indicates that valid authentication input was received by end user mobile computing device 150). If, in validating the authentication response message, client authentication computing platform 110 determines that the authentication response message is invalid, then client authentication computing platform 110 may generate and/or send one or more error messages, and the example event sequence may end. For example, if the authentication response message does not indicate that valid authentication input was received by the at least one registered device (e.g., end user mobile computing device 150) linked to the user account associated with the user account portal, client authentication computing platform 110 may generate an error message for the end user desktop computing device (e.g., end user desktop computing device 140). In addition, client authentication computing platform 110 may send, via the communication interface (e.g., communication interface 113), to the end user desktop computing device (e.g., end user desktop computing device 140), the error message generated for the end user desktop computing device (e.g., end user desktop computing device 140). Alternatively, if, in validating the authentication response message, client authentication computing platform 110 determines that the authentication response message is valid, then the example event sequence may proceed as illustrated.

At step 219, client authentication computing platform 110 may update the authentication token in the authentication database (e.g., based on and/or responsive to validating the authentication response message at step 218). For example, at step 219, if the authentication response message indicates that valid authentication input was received by the at least one registered device (e.g., end user mobile computing device 150) linked to the user account associated with the user account portal, client authentication computing platform 110 may update the authentication token in the authentication database (e.g., client authentication database 112b) to indicate that the request to login to the user account associated with the user account portal has been approved.

At step 220, end user desktop computing device 140 may poll the status of the authentication token in the authentication database. For example, after initially submitting the login request to client authentication computing platform 110, end user desktop computing device 140 may send one or more polling requests to client authentication computing platform 110 to continuously and/or periodically poll the status of the authentication token in client authentication database 112b, so as to check for a change in status indicating whether the authentication request has been approved, denied, timed out, and/or otherwise changed from pending.

Referring to FIG. 2F, at step 221, client authentication computing platform 110 may receive the polling request from end user desktop computing device 140. At step 222, client authentication computing platform 110 may send updated token status information to end user desktop computing device 140. For example, in response to receiving the polling request from end user desktop computing device 140, client authentication computing platform 110 may send updated token status information to end user desktop computing device 140, which at this point in the example event sequence, may indicate that the login request submitted to client authentication computing platform 110 by end user desktop computing device 140 has been approved by end user mobile computing device 150. At step 223, end user desktop computing device 140 may receive the updated token status information from client authentication computing platform 110. In addition, end user desktop computing device 140 may determine that the updated token status information received from client authentication computing platform 110 indicates that the login request has been approved, and at step 224, end user desktop computing device 140 may request a portal interface from client authentication computing platform 110. For example, at step 224, end user desktop computing device 140 may request access to an account overview page of an online banking portal associated with client authentication computing platform 110 and/or user account portal computer system 120.

Figure 2G:
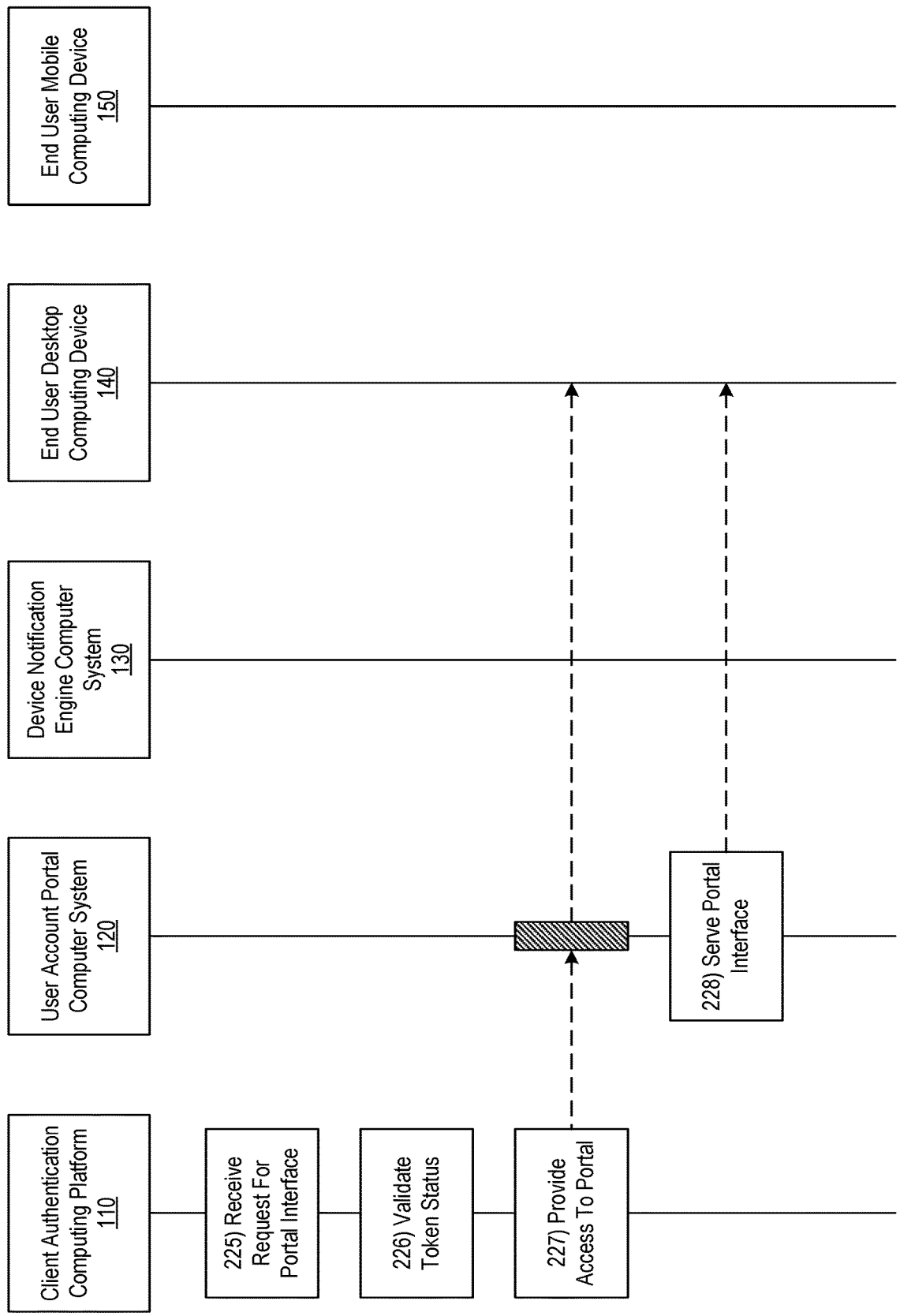

Referring to FIG. 2G, at step 225, client authentication computing platform 110 may receive the request for the portal interface from end user desktop computing device 140. At step 226, client authentication computing platform 110 may validate status information included in the authentication token stored in client authentication database 112b (e.g., to confirm that the user of end user desktop computing device 140 is still authenticated to access the user account portal).

At step 227, client authentication computing platform 110 may provide end user desktop computing device 140 with access to the portal interface (e.g., by redirecting end user desktop computing device 140 to user account portal computer system 120, by embedding one or more headers and/or flags in the redirect command(s), and/or by launching a user account portal session for end user desktop computing device 140 on user account portal computer system 120). For example, at step 227, after updating the authentication token in the authentication database (e.g., client authentication database 112b) to indicate that the request to login to the user account associated with the user account portal has been approved, client authentication computing platform 110 may provide, to the end user desktop computing device (e.g., end user desktop computing device 140), access to a portal interface based on the authentication token in the authentication database (e.g., client authentication database 112b).

In some embodiments, providing the access to the portal interface based on the authentication token in the authentication database may include providing the access to the portal interface after receiving a polling request from the end user desktop computing device. For example, in providing the access to the portal interface based on the authentication token in the authentication database (e.g., client authentication database 112b), client authentication computing platform 110 may provide the access to the portal interface after receiving a polling request from the end user desktop computing device (e.g., end user desktop computing device 140). For instance, client authentication computing platform 110 may provide access to end user desktop computing 110 in response to receiving one or more polling requests from a web application or other application executing on end user desktop computing device 140. Additionally or alternatively, the updating of the token status (e.g., by client authentication computing platform 110 at step 219) may trigger the web application or other application executing on end user desktop computing device 140 to request the portal interface (which may, e.g., be an account overview page of an online banking portal associated with client authentication computing platform 110 and/or user account portal computer system 120).

In some embodiments, providing the access to the portal interface based on the authentication token in the authentication database may include redirecting the end user desktop computing device to a user account portal computer system. For example, in providing the access to the portal interface based on the authentication token in the authentication database (e.g., client authentication database 112b), client authentication computing platform 110 may redirect the end user desktop computing device (e.g., end user desktop computing device 140) to a user account portal computer system (e.g., user account portal computer system 120). For instance, client authentication computing platform 110 may redirect a web application or other application executing on end user desktop computing device 140 to access, request, and/or receive data from user account portal computer system 120 (e.g., by sending one or more uniform resource locators and/or one or more commands to end user desktop computing device 140).

In some embodiments, redirecting the end user desktop computing device to a user account portal computer system may include launching an authenticated user account portal session on the user account portal computer system for a web application on the end user desktop computing device. For example, in redirecting the end user desktop computing device (e.g., end user desktop computing device 140) to a user account portal computer system (e.g., user account portal computer system 120), client authentication computing platform 110 may launch an authenticated user account portal session on the user account portal computer system (e.g., user account portal computer system 120) for a web application on the end user desktop computing device (e.g., end user desktop computing device 140). For instance, client authentication computing platform 110 may generate and send one or more commands to user account portal computer system 120 to launch an authenticated session accessible by a web application executing on end user desktop computing device 140, and the one or more commands may include embedded authentication headers, flags, and/or other information which may be required by user account portal computer system 120 and which may enable end user desktop computing device 140 to access the user account on the portal provided by user account portal computer system 120.

Figure 6:
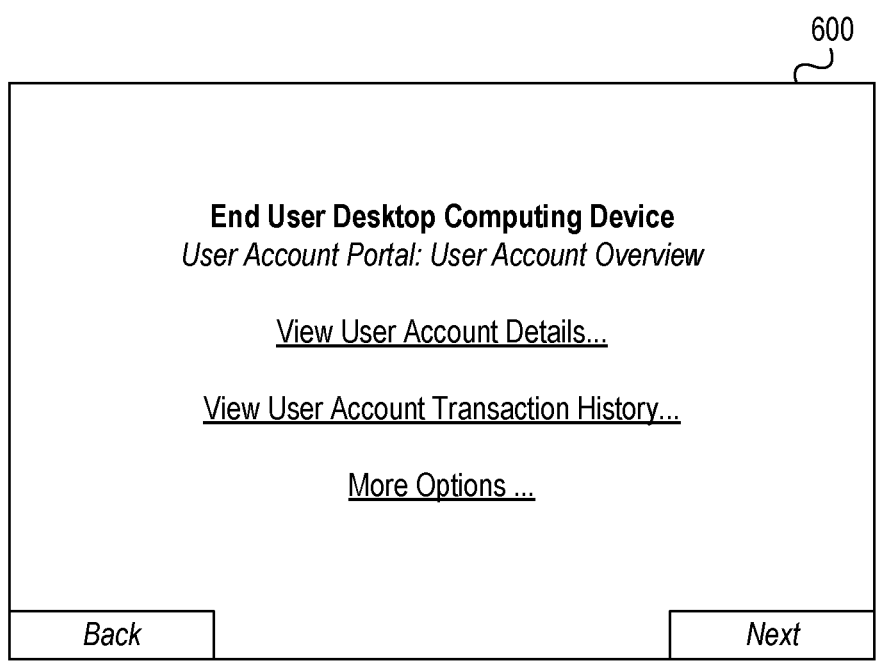

At step 228, user account portal computer system 120 may serve the portal interface to end user desktop computing device 140 (e.g., responsive to and/or based on client authentication computing platform 110 redirecting end user desktop computing device 140 to user account portal computer system 120 and/or responsive to and/or based on one or more commands received by user account portal computer system 120 from client authentication computing platform 110). For example, in serving the portal interface to end user desktop computing device 140, user account portal computer system 120 may generate and/or send one or more graphical user interfaces to end user desktop computing device 140, and user account portal computer system 120 may cause end user desktop computing device 140 to display and/or otherwise present one or more graphical user interfaces similar to graphical user interface 600, which is illustrated in FIG. 6. As seen in FIG. 6, graphical user interface 600 may include text and/or other use interface elements allowing the user of end user desktop computing device 140 to view user account details, view user account transaction history, and/or access other options that may be available via the user account portal provided by user account portal computer system 120.

Subsequently, user account portal computer system 120 may continue providing portal interfaces to end user desktop computing device 140 until the authenticated session is closed or otherwise terminated. In addition, client authentication computing platform 110 may continue authenticating other devices (e.g., different from end user desktop computing device 140 and end user mobile computing device 150) to other user accounts associated with the user account portal, and user account portal computer system 120 may continue providing user account portal interfaces to other devices as such devices are authenticated by client authentication computing platform 110.

Figure 7:
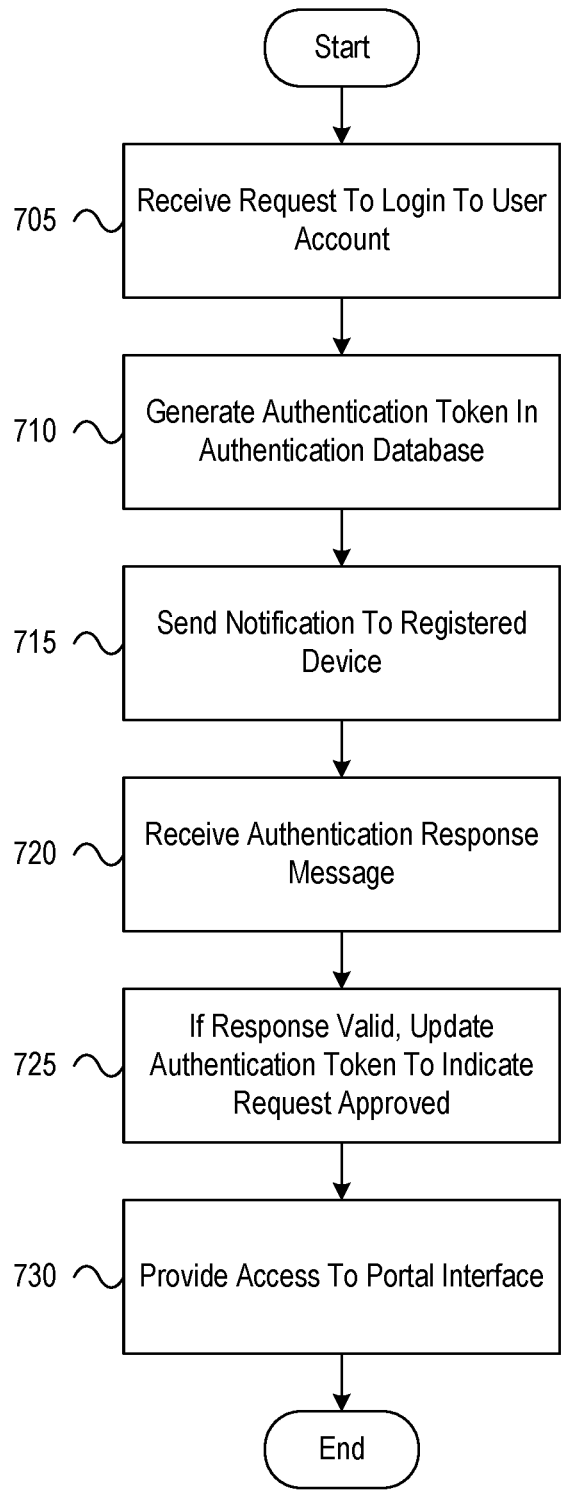
FIG. 7 depicts an illustrative method for preventing unauthorized access to secured information systems using authentication tokens and multi-device authentication prompts in accordance with one or more example embodiments.

FIG. 7 depicts an illustrative method for preventing unauthorized access to secured information systems using authentication tokens and multi-device authentication prompts in accordance with one or more example embodiments. Referring to FIG. 7, at step 705, a computing platform having at least one processor, a communication interface, and a memory may receive, via the communication interface, from an end user desktop computing device, a request to login to a user account associated with a user account portal. At step 710, in response to receiving the request to login to the user account associated with the user account portal, the computing platform may generate an authentication token in an authentication database. At step 715, the computing platform may send a notification to at least one registered device linked to the user account associated with the user account portal.

At step 720, after sending the notification to the at least one registered device linked to the user account associated with the user account portal, the computing platform may receive, via the communication interface, from the at least one registered device linked to the user account associated with the user account portal, an authentication response message. At step 725, if the authentication response message indicates that valid authentication input was received by the at least one registered device linked to the user account associated with the user account portal, the computing platform may update the authentication token in the authentication database to indicate that the request to login to the user account associated with the user account portal has been approved. At step 730, after updating the authentication token in the authentication database to indicate that the request to login to the user account associated with the user account portal has been approved, the computing platform may provide, to the end user desktop computing device, access to a portal interface based on the authentication token in the authentication database.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, via the communication interface, from a user computing device, a request to login to a user account associated with a user account portal, wherein the request to login to the user account associated with the user account portal comprises a username corresponding to the user account associated with the user account portal, and wherein the username corresponding to the user account associated with the user account portal is the only authenticator included in the request to login to the user account associated with the user account portal;
      in response to receiving the username corresponding to the user account associated with the user account portal as the only authenticator:
         generate an authentication token in an authentication database; and
         send a notification to at least one registered device linked to the user account associated with the user account portal;
      after sending the notification to the at least one registered device linked to the user account associated with the user account portal, receive, via the communication interface, from the at least one registered device linked to the user account associated with the user account portal, an authentication response message;
      if the authentication response message indicates that valid authentication input was received by the at least one registered device linked to the user account associated with the user account portal, update the authentication token in the authentication database to indicate that the request to login to the user account associated with the user account portal has been approved; and
      after updating the authentication token in the authentication database to indicate that the request to login to the user account associated with the user account portal has been approved, provide, to the user computing device, access to a portal interface based on the authentication token in the authentication database.

2. The computing platform of claim 1, wherein the memory stores additional computer-readable instructions that, when executed by the at least one processor, cause the computing platform to:
   if the authentication response message does not indicate that valid authentication input was received by the at least one registered device linked to the user account associated with the user account portal:
      generate an error message for the user computing device; and
      send, via the communication interface, to the user computing device, the error message generated for the user computing device.

3. The computing platform of claim 1, wherein the memory stores additional computer-readable instructions that, when executed by the at least one processor, cause the computing platform to:
   prior to generating the authentication token in the authentication database:
      load, from a user account database, user account information corresponding to the user account associated with the user account portal; and
      confirm, based on the user account information loaded from the user account database, that the user account associated with the user account portal is enrolled for multi-device authentication prompts.

4. The computing platform of claim 1, wherein the memory stores additional computer-readable instructions that, when executed by the at least one processor, cause the computing platform to:
   prior to sending the notification to the at least one registered device linked to the user account associated with the user account portal, identify the at least one registered device as being linked to the user account associated with the user account portal based on user account information loaded from a user account database.

5. The computing platform of claim 4, wherein sending the notification to the at least one registered device linked to the user account associated with the user account portal comprises:
   generating one or more commands directing a notification engine system to push at least one authentication notification to the at least one registered device linked to the user account associated with the user account portal; and
   sending, via the communication interface, to the notification engine system, the one or more commands directing the notification engine system to push the at least one authentication notification to the at least one registered device linked to the user account associated with the user account portal.

6. The computing platform of claim 5, wherein the one or more commands directing the notification engine system to push the at least one authentication notification to the at least one registered device linked to the user account associated with the user account portal are configured to cause the at least one registered device linked to the user account associated with the user account portal to present at least one authentication prompt.

7. The computing platform of claim 6, wherein receiving the authentication response message comprises receiving information indicating that valid authentication input was received by the at least one registered device linked to the user account associated with the user account portal in response to the at least one authentication prompt.

8. The computing platform of claim 5, wherein the one or more commands directing the notification engine system to push the at least one authentication notification to the at least one registered device linked to the user account associated with the user account portal are configured to cause the at least one registered device linked to the user account associated with the user account portal to present at least one biometric authentication prompt.

9. The computing platform of claim 8, wherein receiving the authentication response message comprises receiving information indicating that valid authentication input was received by the at least one registered device linked to the user account associated with the user account portal in response to the at least one biometric authentication prompt.

10. The computing platform of claim 1, wherein providing the access to the portal interface based on the authentication token in the authentication database comprises providing the access to the portal interface after receiving a polling request from the user computing device.

11. The computing platform of claim 1, wherein providing the access to the portal interface based on the authentication token in the authentication database comprises redirecting the user computing device to a user account portal computer system.

12. The computing platform of claim 11, wherein redirecting the user computing device to the user account portal computer system comprises launching an authenticated user account portal session on the user account portal computer system for a web application on the user computing device.

13. The computing platform of claim 12, wherein launching the authenticated user account portal session on the user account portal computer system for the web application on the user computing device comprises:
   generating one or more commands comprising embedded authentication headers; and
   sending the one or more commands comprising the embedded authentication headers to the user account portal computer system.

14. The computing platform of claim 1, wherein updating the authentication token in the authentication database to indicate that the request to login to the user account associated with the user account portal has been approved causes a web application on the user computing device to request an account overview page of an online banking portal associated with the computing platform.

15. A method, comprising:
   at a computing platform comprising at least one processor, memory, and a communication interface:
      receiving, by the at least one processor, via the communication interface, from a user computing device, a request to login to a user account associated with a user account portal, wherein the request to login to the user account associated with the user account portal comprises a username corresponding to the user account associated with the user account portal, and wherein the username corresponding to the user account associated with the user account portal is the only authenticator included in the request to login to the user account associated with the user account portal;
      in response to receiving the username corresponding to the user account associated with the user account portal as the only authenticator:
         generating, by the at least one processor, an authentication token in an authentication database; and
         sending, by the at least one processor, a notification to at least one registered device linked to the user account associated with the user account portal;
      after sending the notification to the at least one registered device linked to the user account associated with the user account portal, receiving, by the at least one processor, via the communication interface, from the at least one registered device linked to the user account associated with the user account portal, an authentication response message;
      if the authentication response message indicates that valid authentication input was received by the at least one registered device linked to the user account associated with the user account portal, updating, by the at least one processor, the authentication token in the authentication database to indicate that the request to login to the user account associated with the user account portal has been approved; and after updating the authentication token in the authentication database to indicate that the request to login to the user account associated with the user account portal has been approved, providing, by the at least one processor, to the user computing device, access to a portal interface based on the authentication token in the authentication database.

16. The method of claim 15, comprising:
   if the authentication response message does not indicate that valid authentication input was received by the at least one registered device linked to the user account associated with the user account portal:
      generating, by the at least one processor, an error message for the user computing device; and
      sending, by the at least one processor, via the communication interface, to the user computing device, the error message generated for the user computing device.

17. The method of claim 15, comprising:
   prior to generating the authentication token in the authentication database:
      loading, by the at least one processor, from a user account database, user account information corresponding to the user account associated with the user account portal; and
      confirming, by the at least one processor, based on the user account information loaded from the user account database, that the user account associated with the user account portal is enrolled for multi-device authentication prompts.

18. The method of claim 15, comprising:
   prior to sending the notification to the at least one registered device linked to the user account associated with the user account portal, identifying, by the at least one processor, the at least one registered device as being linked to the user account associated with the user account portal based on user account information loaded from a user account database.

19. The method of claim 18, wherein sending the notification to the at least one registered device linked to the user account associated with the user account portal comprises:
   generating one or more commands directing a notification engine system to push at least one authentication notification to the at least one registered device linked to the user account associated with the user account portal; and
   sending, via the communication interface, to the notification engine system, the one or more commands directing the notification engine system to push the at least one authentication notification to the at least one registered device linked to the user account associated with the user account portal.

20. One or more non-transitory computer-readable media storing instructions that, when executed by a computing platform comprising at least one processor, memory, and a communication interface, cause the computing platform to:
   receive, via the communication interface, from a user computing device, a request to login to a user account associated with a user account portal, wherein the request to login to the user account associated with the user account portal comprises a username corresponding to the user account associated with the user account portal, and wherein the username corresponding to the user account associated with the user account portal is the only authenticator included in the request to login to the user account associated with the user account portal;

in response to receiving the username corresponding to the user account associated with the user account portal as the only authenticator:
   generate an authentication token in an authentication database; and
   send a notification to at least one registered device linked to the user account associated with the user account portal;
after sending the notification to the at least one registered device linked to the user account associated with the user account portal, receive, via the communication interface, from the at least one registered device linked to the user account associated with the user account portal, an authentication response message;
if the authentication response message indicates that valid authentication input was received by the at least one registered device linked to the user account associated with the user account portal, update the authentication token in the authentication database to indicate that the request to login to the user account associated with the user account portal has been approved; and
after updating the authentication token in the authentication database to indicate that the request to login to the user account associated with the user account portal has been approved, provide, to the user computing device, access to a portal interface based on the authentication token in the authentication database.

\* \* \* \* \*